(12) United States Patent
Wong et al.

(10) Patent No.: US 10,440,746 B2
(45) Date of Patent: Oct. 8, 2019

(54) METHOD AND APPARATUS FOR MITIGATING HIDDEN NODE INTERFERENCE

(71) Applicant: Alcatel Lucent, Boulogne-Billancourt (FR)

(72) Inventors: Shin Horng Wong, Chippenham (GB); Teck Hu, Melbourne, FL (US); Feng Han, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 11 days.

(21) Appl. No.: 15/514,266

(22) PCT Filed: Sep. 4, 2015

(86) PCT No.: PCT/IB2015/002435
§ 371 (c)(1),
(2) Date: Mar. 24, 2017

(87) PCT Pub. No.: WO2016/046649
PCT Pub. Date: Mar. 31, 2016

(65) Prior Publication Data
US 2017/0280480 A1 Sep. 28, 2017

(30) Foreign Application Priority Data
Sep. 24, 2014 (CN) .......................... 2014 1 0493987

(51) Int. Cl.
*H04W 74/08* (2009.01)
*H04W 74/00* (2009.01)
(Continued)

(52) U.S. Cl.
CPC ..... *H04W 74/0808* (2013.01); *H04W 74/002* (2013.01); *H04B 17/309* (2015.01); *H04W 28/0268* (2013.01); *H04W 74/0816* (2013.01)

(58) Field of Classification Search
CPC .......... H04W 74/0808; H04W 74/002; H04W 28/0268; H04W 74/0816
(Continued)

(56) References Cited

U.S. PATENT DOCUMENTS

2006/0221999 A1* 10/2006 Bachrach .......... H04W 74/0816
370/465
2008/0112380 A1* 5/2008 Fischer ............. H04W 74/0816
370/338
(Continued)

FOREIGN PATENT DOCUMENTS

CN 1856963 A 11/2006
CN 102104408 6/2011
(Continued)

OTHER PUBLICATIONS

International Search Report PCT/ISA/210 for International Application No. PCT/IB2015/002435 dated Sep. 4, 2015.
(Continued)

*Primary Examiner* — Peter P Chau
(74) *Attorney, Agent, or Firm* — Harness, Dickey & Pierce, P.L.C.

(57) ABSTRACT

The method includes receiving, at a user equipment, a request-to-send (RTS) signal from a base station in an unlicensed channel, the RTS signal including individual IDs or group IDs of multiple user equipments, the multiple user equipments including the user equipment; and identifying whether the RTS signal includes an individual ID or group ID of the user equipment, wherein the identifying includes sending a clear-to-send (CTS) signal to the base station in a licensed channel or the unlicensed channel to allow the base station to perform data transmission to the user equipment in response to the RTS signal including the individual ID or group ID of the user equipment; and ignoring the RTS signal
(Continued)

in response to the RTS signal not including the individual ID or group ID of the user equipment.

9 Claims, 2 Drawing Sheets

(51) Int. Cl.
*H04B 17/309* (2015.01)
*H04W 28/02* (2009.01)

(58) Field of Classification Search
USPC .......................................................... 370/236
See application file for complete search history.

(56) References Cited

U.S. PATENT DOCUMENTS

| | | | |
|---|---|---|---|
| 2011/0028102 A1* | 2/2011 | Li | H04W 74/0816 455/71 |
| 2011/0149918 A1* | 6/2011 | Gong | H04W 72/005 370/336 |
| 2011/0261708 A1* | 10/2011 | Grandhi | H04W 4/06 370/252 |
| 2014/0029561 A1 | 1/2014 | Kim et al. | |
| 2014/0341018 A1* | 11/2014 | Bhushan | H04W 28/0289 370/230 |
| 2014/0341024 A1 | 11/2014 | Bhushan et al. | |
| 2014/0341035 A1 | 11/2014 | Bhushan et al. | |
| 2014/0341053 A1 | 11/2014 | Bhushan et al. | |
| 2014/0341135 A1 | 11/2014 | Bhushan et al. | |
| 2014/0341207 A1 | 11/2014 | Bhushan et al. | |
| 2014/0342745 A1 | 11/2014 | Bhushan et al. | |
| 2015/0215100 A1 | 7/2015 | Jeon et al. | |
| 2015/0365972 A1* | 12/2015 | Seok | H04W 74/0816 370/336 |
| 2016/0043793 A1 | 2/2016 | Gong et al. | |
| 2016/0066195 A1* | 3/2016 | Moon | H04W 16/14 455/454 |
| 2016/0338105 A1* | 11/2016 | Wu | H04W 74/0816 |
| 2017/0064561 A1* | 3/2017 | Tomeba | H04W 16/14 |

FOREIGN PATENT DOCUMENTS

| | | |
|---|---|---|
| CN | 102474727 A | 5/2012 |
| WO | WO-2012/141463 A2 | 10/2012 |
| WO | WO-2014/189915 A2 | 11/2014 |
| WO | WO-2015/116791 A1 | 8/2015 |

OTHER PUBLICATIONS

Chinese Office Action dated Mar. 22, 2019, issued in corresponding Chinese Patent Application No. 201410493987.5.

* cited by examiner

METHOD AND APPARATUS FOR MITIGATING HIDDEN NODE INTERFERENCE

CROSS-REFERENCE TO RELATED APPLICATIONS

This application is a national phase under 35 U.S.C. § 371 of PCT International Application No. PCT/IB2015/002435 which has an International filing date of Sep. 4, 2015, which claims priority to Chinese Application No. 201410493987, filed Sep. 24, 2014, the entire contents of each of which are hereby incorporated by reference.

FIELD OF THE INVENTION

The application relates to a wireless communication field, and particularly to a method and apparatus for mitigating hidden node interference.

BACKGROUND OF THE INVENTION

Currently, a Study Item on LTE working on unlicensed band (LTE-U) has been initiated in 3GPP Rel-13 to standardize this feature. The first stage of LTE-U would consist of using the unlicensed band for supplementary downlink (SDL) and the uplink is sent using the licensed band. Since LTE-U operates in the unlicensed band, it would have to co-exist with other networks, e.g. other LTE-U and Wi-Fi (e.g. 802.11ac).

The hidden node is a well-known problem in FIG. 1 shows two Wi-Fi Access Points (AP), AP#1 and AP#2. Terminal 1 is connected to AP#1 whilst Terminal 2 is connected to AP#2. AP#1 cannot hear the transmission from AP#2 but Terminal 2 can hear both AP#1 and AP#2 transmission. Whilst AP#2 is transmitting data to Terminal 2, AP#1 failing to sense AP#2 transmission may transmit data to Terminal 1, which causes interference to Terminal 2.

Carrier Sense Multiple Access with Collision Avoidance (CSMA/CA) is introduced in Wi-Fi to mitigate the hidden node problem. This is shown in FIG. 2, where AP#2 transmits a "Request to Send" (RTS) to Terminal 2 prior to transmitting any actual data. Any nodes detecting the RTS would refrain from transmission. In response to the RTS, Terminal 2 would sense the channel and if it is free, it would response with a "Clear to Send" (CTS) back to AP#2. Similarly any node that can detect this CTS will refrain from transmitting. In FIG. 2, AP#1 would detect the CTS and would not transmit data to Terminal 1. Upon receiving the CTS, AP#2 would start its data transmission to Terminal 2. In this way the Terminal 2 would avoid being interfered by AP#1.

In existing 802.11ac Standards, the RTS contains a single destination address. However, in LTE, the eNB can schedule multiple UEs within a single sub-frame. This feature should be maintained in LIE-U when employing CSMA/CA mechanism in LTE-U. Specifically, when RTS is used to prevent Hidden Node interference as described above.

The CSMA/CA mechanism can be adopted for LTE-U to mitigate collision between two or more LTE-U network and between LTE-U and WiFi networks. The technical problem to solve is to extend the RTS-CTS to multiple LIES to maintain simultaneous downlink data transmission to multiple UEs in LTE-U. This shall improve upon the single recipient of the existing RTS frame design of 802.11ac.

OBJECT AND SUMMARY OF THE INVENTION

In view of technical problem mentioned above, it would be desirable to achieve a solution for mitigating hidden node interference in this scenario.

To achieve the purpose of the invention, a first aspect of the invention proposes a method for mitigating hidden node interference in an user equipment using an unlicensed channel, the method comprising the steps of: A. receiving a RTS signaling from a base station in an unlicensed channel, the RTS signaling includes individual IDs or group IDs of multiple user equipments; B. identifying whether the RTS signaling includes individual ID or group ID of the user equipment; B1. sending a CTS signaling to the base station in a licensed channel or unlicensed channel to allow the base station to perform data transmission to the user equipment, when the RTS signaling includes the individual ID or group ID of the user equipment; B2. ignoring the RTS signaling, when the RTS signaling does not include the individual ID or group ID of the user equipment.

Advantageously, the step B1 further comprises the step of: sending CTS signaling to WIFI APs in vicinity of the user equipment in the unlicensed channel to prevent the WIFI APs from performing data transmission.

A second aspect of the invention proposes a method for mitigating hidden node interference in a base station using an unlicensed channel, the method comprising the steps of: a. sending a RTS signaling in the unlicensed channel, when there are data to be transmitted to multiple user equipments over the unlicensed channel, wherein the RTS signaling includes individual IDs or group IDs of the multiple user equipments; b. receiving CTS signaling of the multiple user equipments in a licensed channel or unlicensed channel; c. performing data transmission to the multiple user equipments in the unlicensed channel.

A third aspect of the invention proposes an apparatus for mitigating hidden node interference in a user equipment using an unlicensed channel, the apparatus comprising: a receiving unit configured to receive a RTS signaling from a base station in an unlicensed channel, the RTS signaling includes individual IDs or group IDs of multiple user equipments; an identifying unit configured to identify whether the RTS signaling includes individual ID or group ID of the user equipment; a first sending unit configured to send a CTS signaling to the base station in a licensed channel or unlicensed channel to allow the base station to perform data transmission, when the RTS signaling includes the individual ID or group ID of the user equipment.

Advantageously, the apparatus further comprises: a second sending unit configured to send CTS signaling to WIFI APs in vicinity of the user equipment in the unlicensed channel to prevent the WiFi APs from performing data transmission to the user equipment, when the RTS signaling includes the individual ID or group ID of the user equipment.

A fourth aspect of the invention proposes an apparatus for mitigating hidden node interference in a base station using an unlicensed channel, the apparatus comprising. a first sending unit configured to send a RTS signaling in the unlicensed channel, when there are data to be transmitted to multiple user equipments over the unlicensed channel, wherein the RTS signaling includes individual IDs or group IDs of the multiple user equipments; a receiving unit configured to receive CTS signaling of the multiple user equipments in a licensed channel or unlicensed channel; a second sending unit configured to perform data transmission to the multiple user equipments in the unlicensed channel.

A fifth aspect of the invention proposes a method for mitigating hidden node interference in a user equipment using an unlicensed channel, the method comprising the steps of: I. receiving a RTS signaling from a base station in an unlicensed channel, the RTS signaling includes indicator message indicating the presence of target user message; II. receiving the target user message from the base station in an licensed channel, wherein the target user message includes individual IDs or group IDs of multiply user equipments; III. identifying whether the target user message includes individual ID or group ID of the user equipment; III1. sending a CTS signaling to the base station in a licensed channel or unlicensed channel to allow the base station to perform data transmission to the user equipment, when the target user message includes the individual ID or group ID of the user equipment; III2. ignoring the RTS signaling, when the target user message does not include the individual ID or group ID of the user equipment.

Advantageously, the step III1 further comprises the step of: sending CTS signaling to WIFI APs in vicinity of the user equipment in the unlicensed channel to prevent the WIFI APs from performing data transmission.

Advantageously, the step II further comprises the step of: receiving the target use message in a specific sub-frame of the licensed channel according to a sub-frame position value.

Advantageously, wherein the sub-frame position value is predetermined or signaled to the user equipment via the RTS signaling.

A sixth aspect of the invention proposes a method for mitigating hidden node interference in a base station using an unlicensed channel, the method comprising the steps of: i. sending a RTS signaling in the unlicensed channel, when there are data to be transmitted to multiple user equipments over the unlicensed channel, wherein the RTS signaling includes indicator message indicating the presence of target user message; ii. sending the target user message in a licensed channel, wherein the target user message includes individual IDs or group IDs of the multiple user equipments; iii, receiving CTS signaling of the multiple user equipments in a licensed channel or unlicensed channel; iv. performing data transmission to the multiple user equipments in the unlicensed channel.

A seventh aspect of the invention proposes an apparatus for mitigating hidden node interference in an user equipment using an unlicensed channel, the apparatus comprising: a first receiving unit configured to receive a RTS signaling from a base station in an unlicensed channel, the RTS signaling includes indicator message indicating the presence of target user message; a second receiving unit configured to receive the target user message from the base station in an licensed channel, wherein the target user message includes individual IDs or group IDs of multiply user equipments; an identifying unit configured to identify whether the target user message includes individual ID or group ID of the user equipment; a first sending unit configured to send a CTS signaling to the base station in a licensed channel or unlicensed channel to allow the base station to perform data transmission to the user equipment, when the target user message includes the individual ID or group ID of the user equipment.

Advantageously, the apparatus further comprises: a second sending unit configured to send CTS signaling to WIFI APs in vicinity of the user equipment in the unlicensed channel to prevent the WIFI APs from performing data transmission, when target user message includes the individual ID or group ID of the user equipment.

Advantageously, the second sending unit receives the target use message in a specific sub-frame of the licensed channel according to a sub-frame position value, and the sub-frame position value is predetermined or signaled to the user equipment via the RTS signaling.

A eighth aspect of the invention proposes an apparatus for mitigating hidden node interference in a base station using an unlicensed channel, the apparatus comprising: a first sending unit configured to send a RTS signaling in the unlicensed channel, when there are data to be transmitted to multiple user equipments over the unlicensed channel, wherein the RTS signaling includes indicator message indicating the presence of target user message; a second sending unit configured to send the target user message in a licensed channel, wherein the target user message includes individual Ds or group IDs of the multiple user equipments; a receiving unit configured to receive CTS signaling of the multiple user equipments in a licensed channel or unlicensed channel; a third sending unit configured to perform data transmission to the multiple user equipments in the unlicensed channel.

In summary, the inventive methods and apparatuses could mitigate the hidden node interference between base stations supporting multiple UEs using unlicensed channel and other serving node by means of RTS-CTS. Besides, the system-level throughput and spectrum efficiency are improved due to the avoidance of hidden node problem in LTE-U system.

BRIEF DESCRIPTION OF THE DRAWINGS

The invention is explained in further detail, and by way of example, with reference to the accompanying drawings wherein.

DETAILED DESCRIPTION

The following particular description of preferred embodiments will be given with reference to the drawings constituting a part of the invention. The drawings exemplarily illustrate particular embodiments, in which the invention can be practiced. The exemplary embodiments are not intended to exhaust all the embodiments of the invention. As can be appreciated, other embodiments can be possible or structural or logical modifications can be made without departing from the scope of the invention. Thus the following detailed description is not intended to be limiting, and the scope of the invention will be defined as in the appended claims.

As mentioned above, the present invention provides a solution for solving the hidden node problem between base stations using unlicensed channel and other serving node. As an example, the base station could be a LTE-U base station. However, the base station could also be any base station using unlicensed channel. Corresponding to the LTE-U base station, the user equipment should also be a user equipment. In the following description of this invention, the word "user equipment" means an user equipment belonging to LTE-U. Besides, those skilled in the art shall appreciate that the serving node may also be any node using the unlicensed channel. But for the sake of the description, the serving node is exemplarily considered to be a Wi-Fi Access Point or a LTE-U base station.

Figure 1:
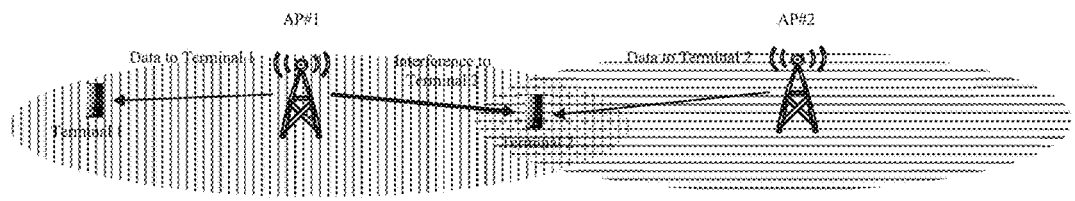
FIG. 1 illustrates a schematic view of hidden node interference between two Wi-Fi Access Points.
Figure 2:
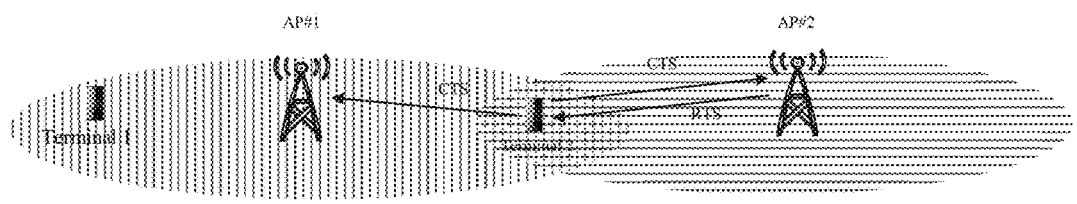
FIG. 2 illustrates a schematic view of the RTS/CTS mechanism for solving the hidden node interference between two Wi-Fi Access Points.
Figure 3:
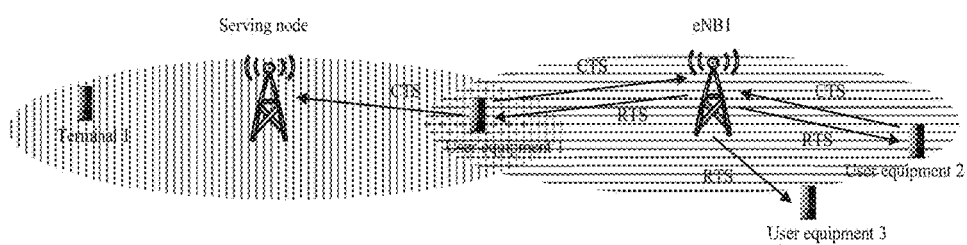
FIG. 3 illustrates a schematic view of the RTS/CTS mechanism for mitigating the hidden node interference between Wi-Fi Access Point and base station using unlicensed channel.
Figure 4:
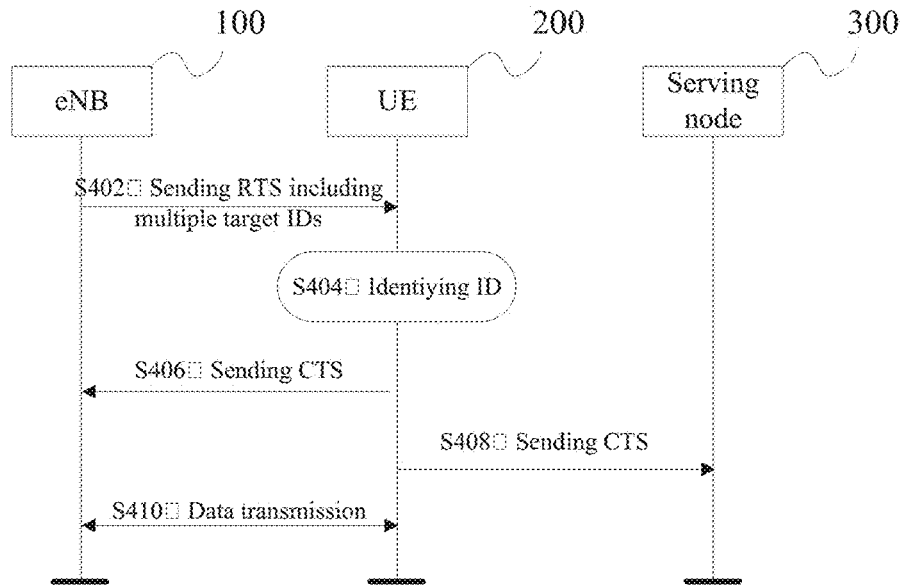
FIG. 4 illustrates a flow chart of a method for mitigating hidden node interference in accordance with a first aspect of this invention.

The method for mitigating hidden node interference in accordance with an aspect of this invention will be illustrated based on FIGS. 3 and 4. FIG. 4 shows a flow chart of a method for mitigating hidden node interference in accordance with an aspect of this invention, which includes a LTE-U base station (eNB) 100, LTE-U user equipment (UE) 200 and serving node 300. It should be noted that although the following description only discloses the operation procedure of user equipment 200, other LTE-U user equipments could also execute same steps to implement the method of the invention.

In step 402, a RTS sending unit of LTE-U base station 100 sends a RTS signaling in the unlicensed channel when there are data to be transmitted to multiple user equipments over the unlicensed channel, wherein the RTS signaling includes individual IDs or group IDs of the multiple user equipments to which data is transmitted. Every individual ID (e.g. C-RNTI) corresponds to a specific user equipment, and every group ID corresponds to a plurality of specific user equipments. In order to maintain backward compatible with UE that can decode WLAN packet, the RTS frame format could be unchanged based on existing RST frame format. A destination field of the RTS is encoded with the individual IDs and group IDs of multiple user equipments to thereby enabling only LTE-U user equipment in this unlicensed channel to identify the individual IDs and group IDs in the destination field. Correspondingly, a receiving unit in user equipment 200 receives the RTS signaling form the base station 100 in the unlicensed channel.

In step 404, an identifying unit of user equipment 200 identifies whether the RTS signaling includes individual ID or group ID of the user equipment 200.

When the RTS signaling does not include the individual ID or group ID of the user equipment 200, which means there are no data to be transmitted to the user equipment 200 over the unlicensed channel by the LTE-U base station 100, the user equipment 200 will ignore the RTS signaling.

When the RTS signaling includes the individual ID or group ID of the user equipment 200, in step 406, a first CTS sending unit of user equipment 200 will send a CTS signaling to the base station 200 in a licensed channel or unlicensed channel to allow the base station 100 to perform data transmission to the use equipment 200. Besides, in step 408, a second CTS sending unit of user equipment 200 will send a CTS signaling to all serving nodes (e.g. WIFI APs) 300 in vicinity of the user equipment in the unlicensed channel to prevent the serving nodes 300 from performing data transmission.

In step 410, a CTS receiving unit of LTE-U base station 100 receives CTS signaling of the multiple user equipments including the user equipment 200 via the licensed channel or unlicensed channel, and then a data transmission unit of LTE-U base station 100 performs data transmission to the multiple user equipments including the user equipment 200 in the unlicensed channel based on the CTS signaling.

FIG. 3 depicts an embodiment according to the method disclosed above. UE1, UE2 and UE3 are connected to base station (eNB1). UE1 and terminal 1 are within the coverage of serving node.

The base station (eNB1) needs to transmit downlink data to UE1 and UE2 in a sub-frame over the unlicensed channel. The base station (eNB1) transmits a RTS signaling that contains the IDs for UE1 and UE2. All UEs under the coverage of eNB1 receive this RTS signaling and identify their IDs in this RTS signaling. After UE1 and UE2 find their own IDs, they will send corresponding CTS signaling to the base station (eNB1) in licensed channel to response to the base station eNB1). UE3 fails to identify its own ID within this RTS signaling, and therefore does not respond to the base station (eNB1). In addition, UE1 and UE2 could also transmit the CTS signaling in the unlicensed channel to inform other serving nodes in the vicinity to prevent other serving nodes from transmitting data.

Figure 5:
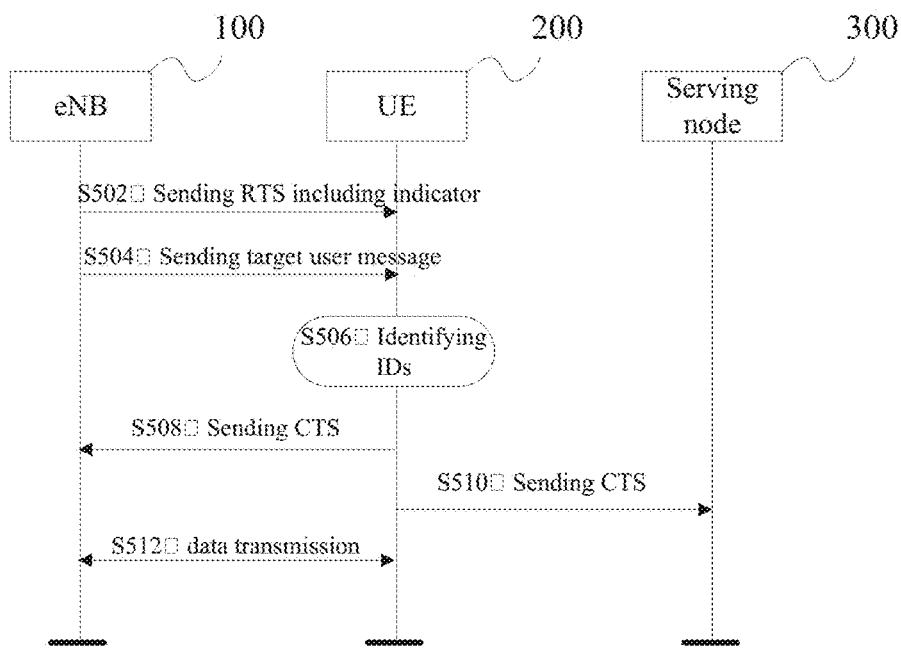
FIG. 5 illustrates a flow chart of a method for mitigating hidden node interference in accordance with a second aspect of this invention.

Another aspect of the invention proposes another method for mitigating hidden node interference. FIG. 5 shows a flow chart of a method for mitigating hidden node interference in accordance with another aspect of this invention, which includes a LTE-U base station (eNB) 100, LTE-U user equipment (UE) 200 and serving node 300. It should be noted that although the following description only discloses the operation procedure of user equipment 200, other LTE-U user equipments could also execute same steps to implement the method of the invention.

In step 502, a RTS sending unit of LTE-U base station 100 sends a RTS signaling in the unlicensed channel when there are data to be transmitted to multiple user equipments over the unlicensed channel, wherein the RTS signaling includes indicator message indicating the presence of a target user message. The target user message includes individual IDs or group IDs of the multiple user equipments to which data is transmitted, wherein every individual ID (e.g. C-RNTI) corresponds to a specific user equipment, and every group ID corresponds to a plurality of specific user equipments. In order to maintain backward compatible with UE that can decode WLAN packet, the RTS frame format could be unchanged based on existing RST frame format. A new destination ID could be introduced in destination field of RST signaling for the indicator message.

In a sub-embodiment, the RTS signaling can be transmitted in another unlicensed band, which allows the base station 100 to utilize another unlicensed channel that has already been reserved by the base station 100, for example for an existing transmission.

Correspondingly, a RTS receiving unit of user equipment 200 receives the RTS signaling including the indicator message from the base station 100 in the unlicensed channel.

In step 504, a target message sending unit of LTE-U base station 100 sends the target user message in a specific sub-frame of licensed channel. The specific sub-frame is determined according to sub-frame position value. The specific sub-frame could be the sub-frame corresponding to the time when the RST signaling is transmitted or be the N-th sub-frame after the signaling is transmitted. In a specific embodiment, the sub-frame position value is predetermined, or is determined by base station 100 and signaled to the user equipment 200 via the RTS signaling. In a specific embodiment, the target user message could be sent in the licensed channel, e.g. as a PDSCH or as a new DCI in PDCCH/EPDCCH.

Correspondingly, a target message receiving unit of user equipment 200 receives the target user message from the base station 200 in the specific sub-frame of licensed channel, wherein the specific sub-frame is determined according to sub-frame position value. The sub-frame position value is predetermined, or is determined by base station 100 and signaled to the user equipment 200 via the RTS signaling.

In step 506, an identifying unit of user equipment 200 identifies whether the target user message includes individual ID or group ID of the user equipment 200.

When the target user message does not include the individual ID or group ID of the user equipment 200, which means there are no data to be transmitted to the user equipment 200 over the unlicensed channel by the LTE-U base station 100, the user equipment 200 will ignore the RTS signaling.

When the target user message includes the individual ID or group ID of the user equipment 200, in step 508, a first CTS sending unit of user equipment 200 will send a CTS signaling to the base station 200 in a licensed channel or unlicensed channel to allow the base station 100 to perform data transmission to the use equipment 200. Besides, in step 510, a second CTS sending unit of user equipment 200 will send a CTS signaling to all serving nodes (e.g. WIFI APs) 300 in vicinity of the user equipment in the unlicensed channel to prevent the serving nodes 300 from performing data transmission.

In step 512, a CTS receiving unit of LTE-U base station 100 receives CTS signaling of the multiple user equipments including the user equipment 200 via the licensed channel or unlicensed channel, and then a data transmission unit of LTE-U base station 100 performs data transmission to the multiple user equipments including the user equipment 200 in the unlicensed channel based on the CTS signaling.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

What is claimed is:

1. A method for mitigating interference in a user equipment, the method comprising:
   receiving, at the user equipment, a request-to-send (RTS) signal from a base station in an unlicensed channel, the RTS signal including an indicator message indicating a presence of a target user message;
   receiving the target user message from the base station in a licensed channel, the target user message including individual IDs or group IDs of multiple user equipments, the multiple user equipments including the user equipment; and
   identifying whether the target user message includes an individual ID or group ID of the user equipment, wherein the identifying includes,
      sending a clear-to-send (CTS) signal to the base station in the licensed channel or the unlicensed channel to allow the base station to perform data transmission to the user equipment in response to the target user message including the individual ID or group ID of the user equipment; and
      ignoring the RTS signal in response to the target user message not including the individual ID or group ID of the user equipment.

2. The method of claim 1, wherein the sending further includes sending the CTS signal to WIFI access points (APs) in a vicinity of the user equipment in the unlicensed channel to prevent the WIFI APs from performing data transmission to the user equipment.

3. The method of claim 1, wherein the receiving further includes receiving the target user message in a specific sub-frame of the licensed channel according to a sub-frame position value.

4. The method of claim 3, wherein the sub-frame position value is predetermined or signaled to the user equipment via the RTS signal.

5. The method of claim 1, further comprising:
   performing data transmission to the multiple user equipments in the unlicensed channel in response to receiving CTS signals of the multiple user equipments.

6. A system for mitigating interference in a user equipment, the system comprising:
   a first memory storing computer-readable instructions; and
   at least one first processor associated with the user equipment configured to execute the computer-readable instructions to,
      receive a request-to-send (RTS) signal from a base station in an unlicensed channel, the RTS signal including an indicator message indicating a presence of a target user message;
      receive the target user message from the base station in a licensed channel, the target user message including individual IDs or group IDs of multiple user equipments, the multiple user equipments including the user equipment; and
      identify whether the target user message includes an individual ID or group ID of the user equipment, wherein the identifying includes,
         sending a clear-to-send (CTS) signal to the base station in the licensed channel or the unlicensed channel to allow the base station to perform data transmission to the user equipment in response to the target user message including the individual ID or group ID of the user equipment; and
         ignoring the RTS signal in response to the target user message not including the individual ID or group ID of the user equipment.

7. The system of claim 6, wherein the at least one first processor is further configured to execute the computer-readable instructions to send the CTS signal to WIFI access points (APs) in a vicinity of the user equipment in the unlicensed channel to prevent the WIFI APs from performing data transmission to the user equipment in response to the target user message including the individual ID or group ID of the user equipment.

8. The system of claim 7, wherein the at least one first processor is further configured to receive the target user message in a specific sub-frame of the licensed channel according to a sub-frame position value, wherein the sub-frame position value is predetermined or signaled to the user equipment via the RTS signal.

9. The system of claim 6, further comprising:
   a second memory storing computer-readable instructions; and
   at least one second processor associated with the base station configured to execute the computer-readable instructions to,
      perform data transmission to the multiple user equipments in the unlicensed channel in response to receiving CTS signals of the multiple user equipments.

* * * * *